US006435633B2

(12) United States Patent  (10) Patent No.: US 6,435,633 B2
Hoshi                     (45) Date of Patent:     Aug. 20, 2002

(54) ARTICLE HOLDER WITH LIFT MECHANISM

(75) Inventor: Shouichi Hoshi, Utsunomiya (JP)

(73) Assignee: Nifco Inc., Yokohama (JP)

( * ) Notice: Subject to any disclaimer, the term of this patent is extended or adjusted under 35 U.S.C. 154(b) by 0 days.

(21) Appl. No.: 09/812,942

(22) Filed: Mar. 27, 2001

(30) Foreign Application Priority Data

Apr. 5, 2000 (JP) ........................................ 2000-103879

(51) Int. Cl.[7] .............................................. A47B 67/02
(52) U.S. Cl. ...................... 312/242; 312/276; 312/321.5
(58) Field of Search ................................. 312/327, 328, 312/325, 276, 242, 321.5, 405.1, 246, 248

(56) References Cited

U.S. PATENT DOCUMENTS 2,542,162 A  *  2/1951  Sutton
2,673,783 A  *  3/1954  Rahm et al.
5,190,259 A  *  3/1993  Okazaki
5,628,486 A  *  5/1997  Rossman et al.

FOREIGN PATENT DOCUMENTS

JP    11-151968    *  6/1999
JP    11-227513    *  8/1999

* cited by examiner

*Primary Examiner*—Janet M. Wilkens
(74) *Attorney, Agent, or Firm*—Kanesaka & Takeuchi

(57) ABSTRACT

An article holder includes a case to be assembled into an assembling subject and having an opening vertically disposed; a lid rotatably assembled to the case to be rotatable from a stand-up position for closing the opening to a flat-down position for opening the opening; and an article holding member disposed to an inner surface side of the lid. A lift arm is rotatably connected to the inner surface portion of the lid and the article holding member, and a linking mechanism is disposed for rotating the lift arm. Thus, when the lid is opened, the article holding member is separated from the inner surface of the lid and moved in front of the opening of the case.

7 Claims, 9 Drawing Sheets

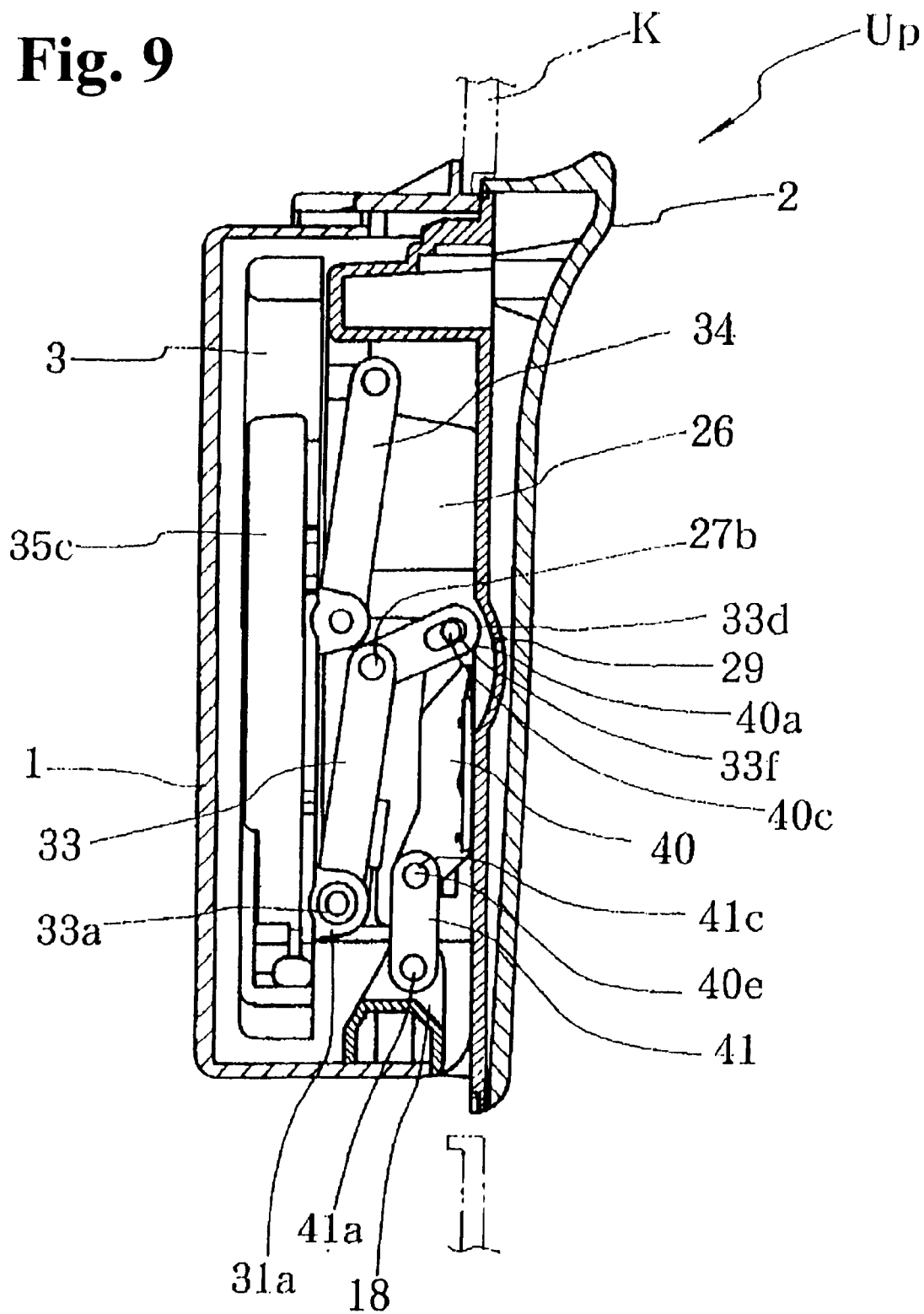

ARTICLE HOLDER WITH LIFT MECHANISM

BACKGROUND OF THE INVENTION AND RELATED ART STATEMENT

The invention relates to an improvement of an article holder having an article holding member for holding an article assembled on an inner surface of a lid attached to a case, wherein the lid moves from a stand-up position to a flat-down position.

Japanese Patent Publication (KOKAI) No. 11-151968 discloses a small article holder, i.e. article holding device, including a holding plate, i.e. article holding member. A lower edge portion of the holding plate is rotatably connected to a side edge on an inner surface portion of a receiving plate, i.e. lid, provided to be rotatable from its stand-up position to its flat-down position, and an upper edge portion of the holding plate is supported between a pair of holding arms rotatably connected to an inner wall portion for forming an opening of a console box which is closed by the receiving plate.

However, in such a conventional device, as the receiving plate is rotated from the stand-up position to the flat-down position, the holding plate is simply moved out horizontally from an inside of the console box, so that a forward edge of the holding plate horizontally moved is not greatly separated from a vertical outer wall surface of the console box. Therefore, in case such conventional article holder is provided on a side of a console lid closing an upper opening of the console box, when the console lid starts opening, a base portion on a rotatably assembled side of the console lid is liable to interfere with an article held by the holding plate.

Also, since the holding plate is disposed between the pair of the holding arms, upper portions of the holding arms are inevitably positioned on both sides of the holding plate, so that the upper portions of the thus positioned holding arms hinder the article from being held on the holding plate.

In order to obviate the defects of the conventional article holder, an object of the present invention is to provide an article holder, wherein as a lid of a case is rotated toward its flat-down position, an article holding member disposed on an inner side of the lid is moved and separated from a subject (hereinafter referred to as "assembling subject") where the case is attached, so that an article can be easily and properly held by the article holding member.

Further objects and advantages of the invention will be apparent from the following description of the invention.

SUMMARY OF THE INVENTION

In order to attain the above object, according to one aspect of the present invention, an article holder includes: (1) a case to be assembled or incorporated into a subject such that an opening of the case is positioned in a vertical direction; (2) a lid assembled to the case to be rotatable from a stand-up position for closing the opening of the case to a flat-down position for opening the opening of the same; (3) an article holding member to be disposed on the inner surface side of the lid by a lift arm rotatably assembled to the inner surface of the lid; and (4) a linking mechanism for rotating the lift arm to separate the article holding member from the inner surface of the lid and to transfer the same in front of the opening of the case as the lid is rotated to the flat-down position.

According to the structure as described above, as the lid is rotated from the stand-up position for closing the opening of the case to the flat-down position, the article supporting member can be separated from the lid by the lift arm, and at the same time, the article holding member as a whole can be transferred in a direction away from a rotatably assembled position of the lid and the case, i.e. in the direction of the front side of the opening of the case.

More specifically, as the lid is rotated from the standup position to the flat-down position, when one edge portion of the lift arm is pulled in a direction approaching the rotatably assembled position of the lid and the case, the article holding member close to the lid at the stand-up position can be gradually separated from the lid as the lid approaches the flat-down position and moved in front of the opening of the case.

Also, when the one edge portion of the lift arm is pushed in a direction away from the rotatably assembled position of the case and the lid as the lid is rotated from its flat-down position to its stand-up position, the article holding member positioned away from the lid at the flat-down position is gradually approaching the lid as the lid approaches its stand-up position. The article holding member can be transferred toward the opening of the case, and is moved to a lower side of the case so that a forward edge of the article holding member moved in front of the opening at the flat-down position is moved to the lower side of the case not to prevent the article holding member from being housed in the case.

As a result, first, the article holding member is positioned and supported over the lid in a state where the article holding member is separated from the assembling subject. Thus, an article can be supported in a state where a space between the assembling subject and the article held on the article holding member or the article positioned on the lid with support of the article holding member at its side portions, is widened.

Second, the article can be held in a state where the space between the lid and the article holding member is widened.

Third, in the stand-up state of the lid, a space between the lid and the case is shortened, so that the article holding member can be housed in the case with a minimum housing space, i.e. main depth of the case.

Fourth, since the article holding member can be held over the lid by the lift arm at a back surface of the article holding member, there are no parts for preventing support of the article in a holding space over the article holding member.

Also, according to a second aspect of the invention, the linking mechanism in the article holder of the first aspect is formed of: (1) a slider rotatably connected to an edge portion opposite to the edge portion of the lift arm assembled to the article holding member at a front edge thereof located on the forward edge side of the lid, and assembled to the lid to be movable toward the rotatably assembled side with the case from the forward edge side of the lid; and (2) a linking arm, one end of which is rotatably assembled to the case and the other end of which is rotatably assembled to a rear edge of the slider. The linking arm allows the slider to move away from the forward end side of the lid as the lid is rotated to the flat-down position.

According to the structure as described above, through rotation of the lid from its stand-up position to its flat-down position, the slider can be slidably moved in a direction approaching the rotatably assembled position of the lid by the linking arm for moving the rotatably assembled position with the slider downward around the rotatably assembled position with the case. The lift arm can be rotated through the movement of the slider so that the end portion of the lift arm assembled to the article holding member and the opposite end portion thereto are pulled to move in a direction separating the article holding member from the lid.

Also, when the lid in the flat-down position is rotated to the stand-up position, by the linking arm for moving the rotatably assembled position with the slider upward around the rotatably assembled position with the case, the slider can be slidably moved in the direction separated from the rotatably assembled position with the lid. Through the movement of the slider, the lift arm can be rotated so that the end portion opposite to the end portion assembled to the article holding member of the lift arm is pushed to move in a direction allowing the article holding member to approach the lid.

According to a third aspect of the invention, the lift arm in the article holder according to the second aspect of the invention is structured such that: (1) the lift arm is formed in a curved or bent state so that a rotatably assembled side of the lid with respect to the case becomes a curved inner side and a curved position is rotatably connected to the lid; and (2) a stroke or length between the curved position and the rotatably assembled position with the article holding member of the lift arm is longer than that between the curved position and the rotatably assembled position with the slider.

According to the structure as described above, even if a moving quantity of the slider is small, an edge side of the lift arm assembled to the article holding member can be greatly moved, so that while limiting the moving quantity of the slider by the linking arm to the minimum, the article holding member can be effectively moved in a direction away from the lid and in front of the opening of the case.

According to a fourth aspect of the invention, the article holding member of the article holder according to the first aspect includes a holding portion for holding a beverage container in a stand-up state at its side.

According to the structure as described above, the beverage container, a bottom of which is positioned on an inner surface portion of the lid to stand up thereon, can be held on a side of the assembling subject to keep the stand-up state by the holding portion of the article holding member.

BRIEF DESCRIPTION OF THE DRAWINGS

FIG. 9 is a sectional view for showing an essential part of the article holder with the lid in the stand-up position.

DETAILED DESCRIPTION OF PREFERRED EMBODIMENTS

Hereunder, with reference to FIGS. 1 to 9, an embodiment of the present invention is explained.

Figure 1:
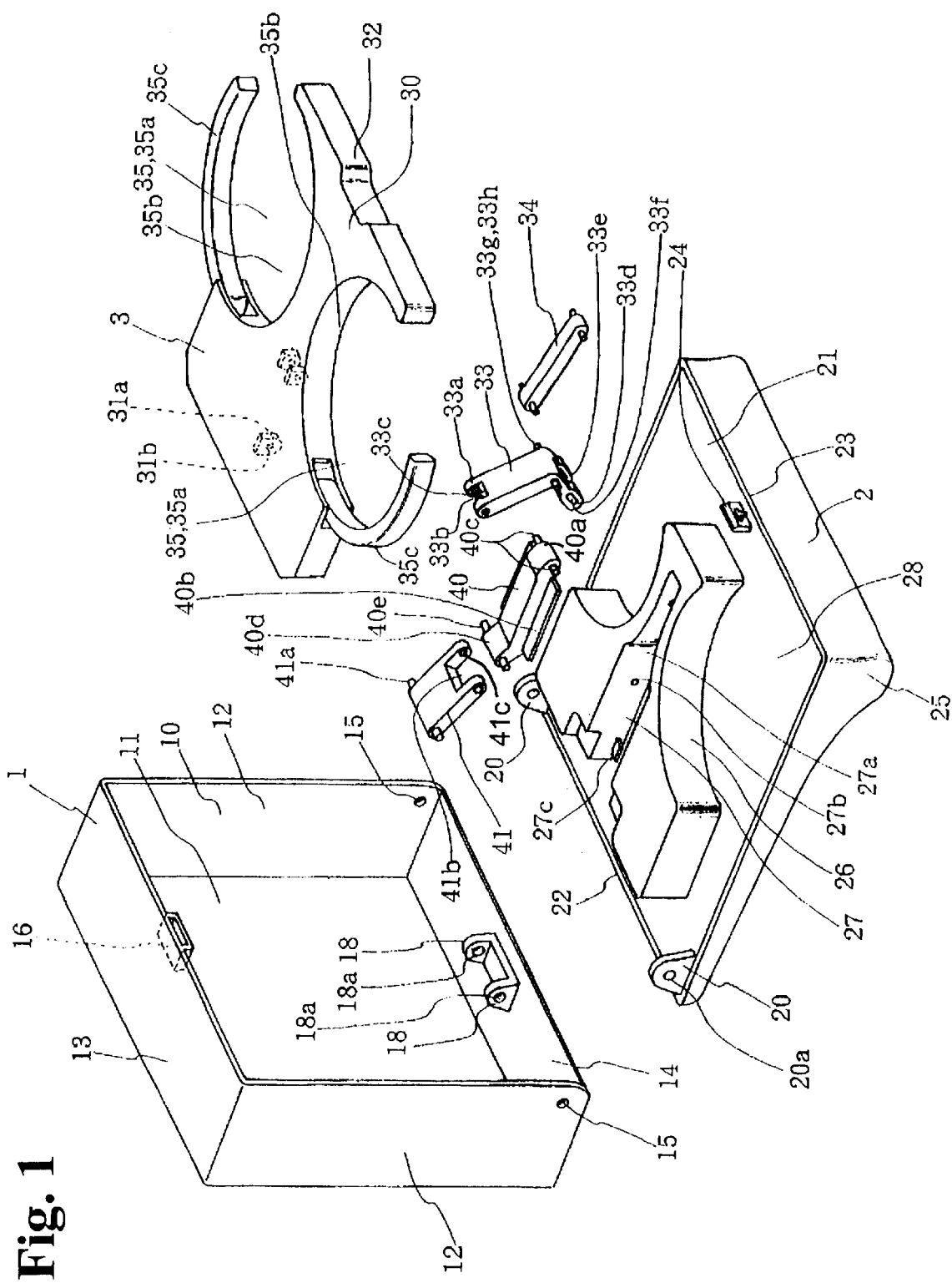
FIG. 1 is an exploded perspective view showing an article holder according to the invention.
Figure 2:
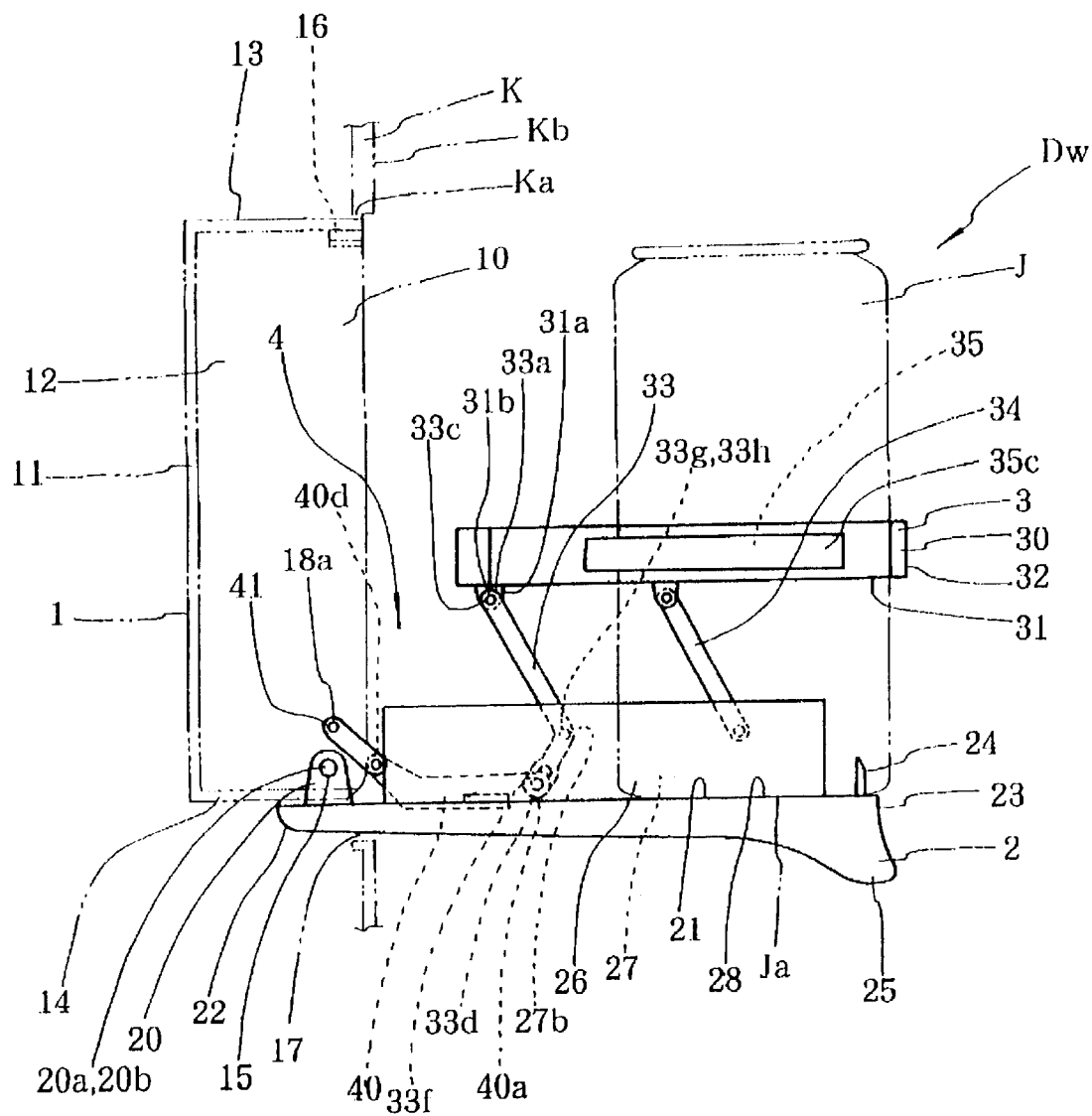
FIG. 2 is a side view showing the article holder with a lid in a flat-down position.
Figure 3:
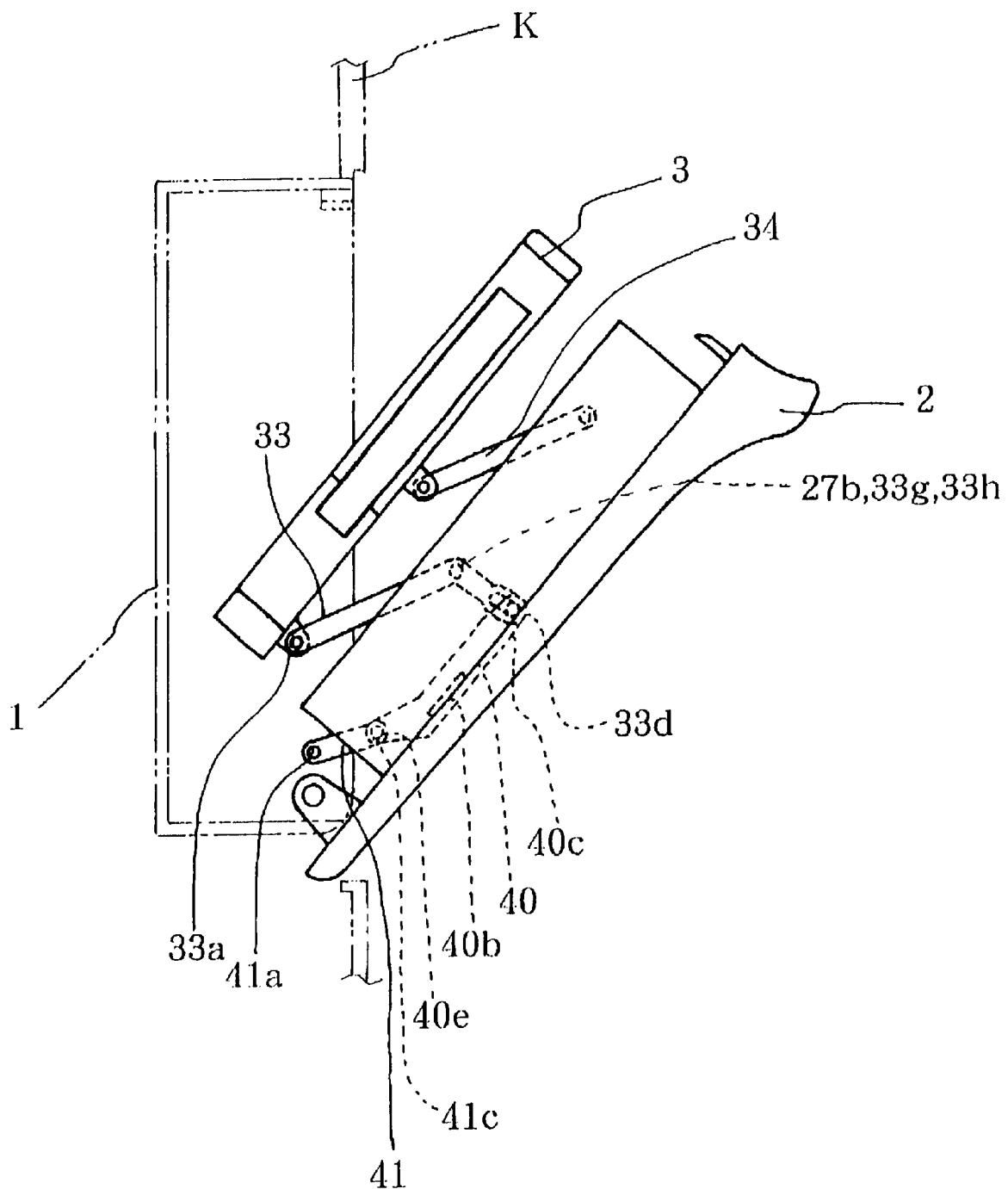
FIG. 3 is a side view showing the article holder with the half opened lid.
Figure 4:
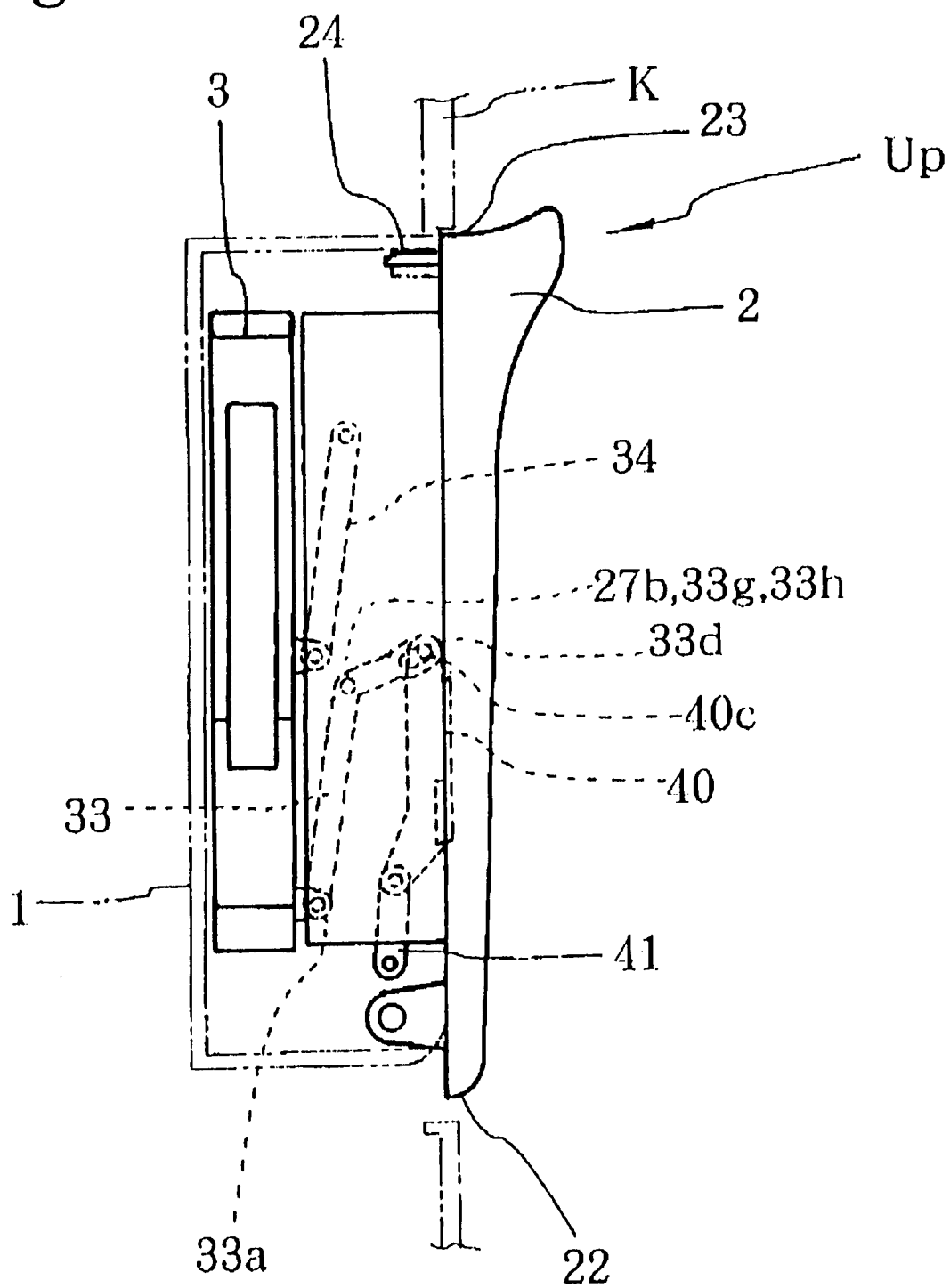
FIG. 4 is a side view showing the article holder with the lid in a stand-up position.

Incidentally, FIGS. 1 to 4 show a structure of an article holder, wherein FIG. 1 shows an exploded perspective view of elements for constituting the article holder; FIG. 2 shows a state where the article holder with a lid 2 opened in a flat-down position Dw is viewed from a side; FIG. 4 shows a state where the article holder with the lid 2 closed in a stand-up position Up is viewed from the side; and FIG. 3 shows a state where the article holder with the lid 2 located in a middle rotating position between the flat-down position Dw and the stand-up position Up is viewed from the side, respectively.

Figure 5:
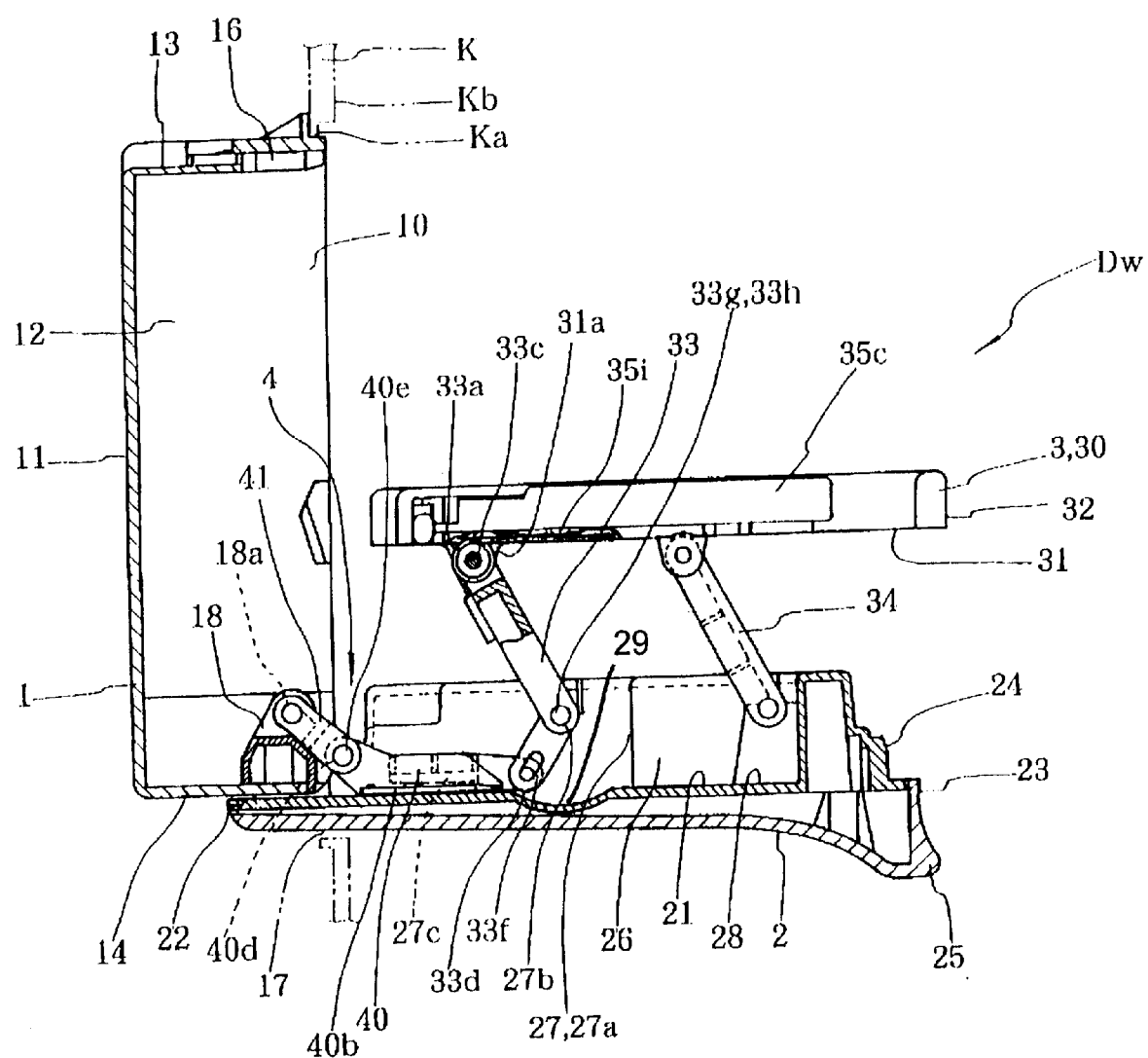
FIG. 5 is a sectional side view showing an essential part of the article holder with the lid in the flat-down position.
Figure 6:
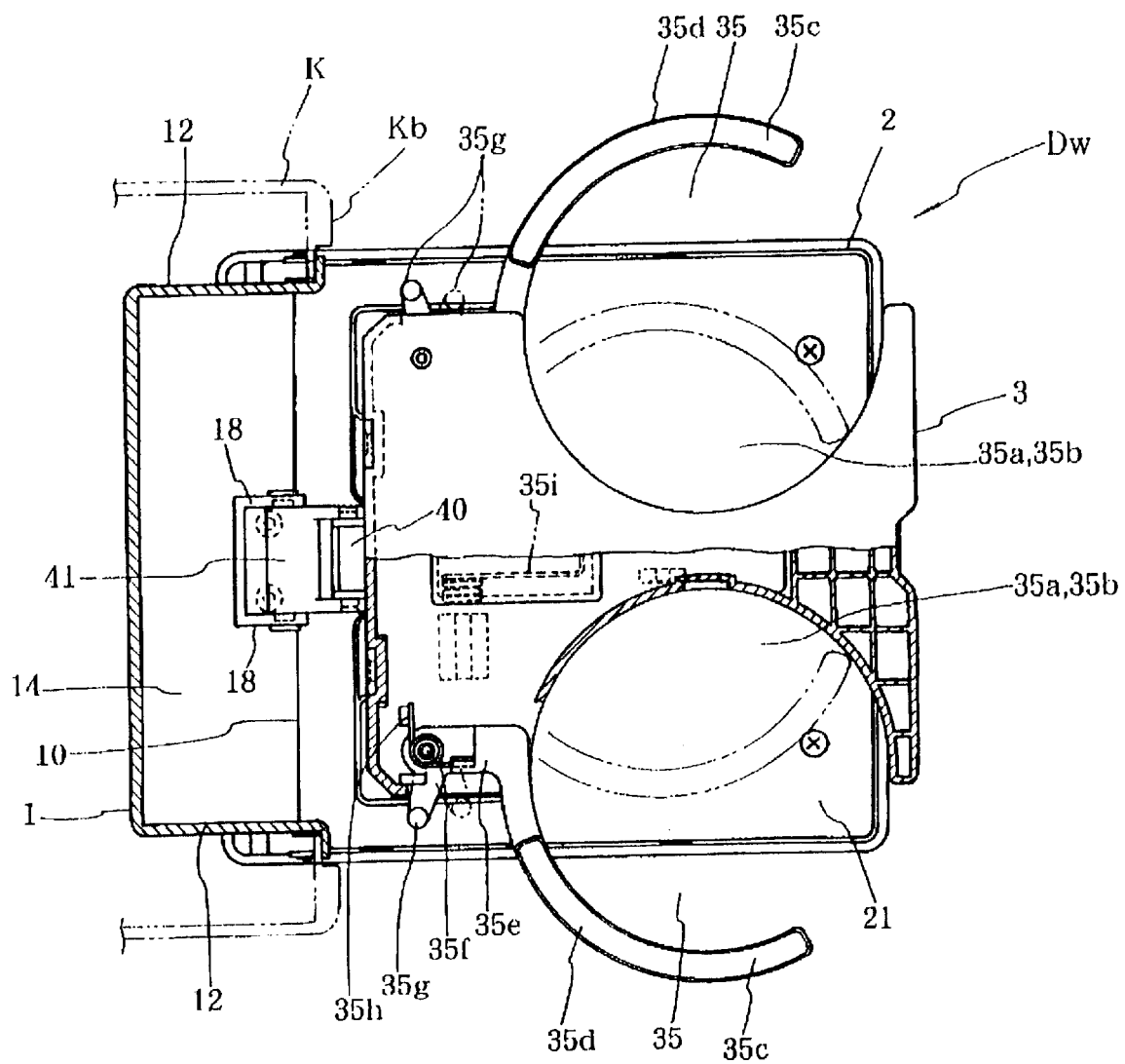
FIG. 6 is a plan view showing an essential part of the article holder.
Figure 7:
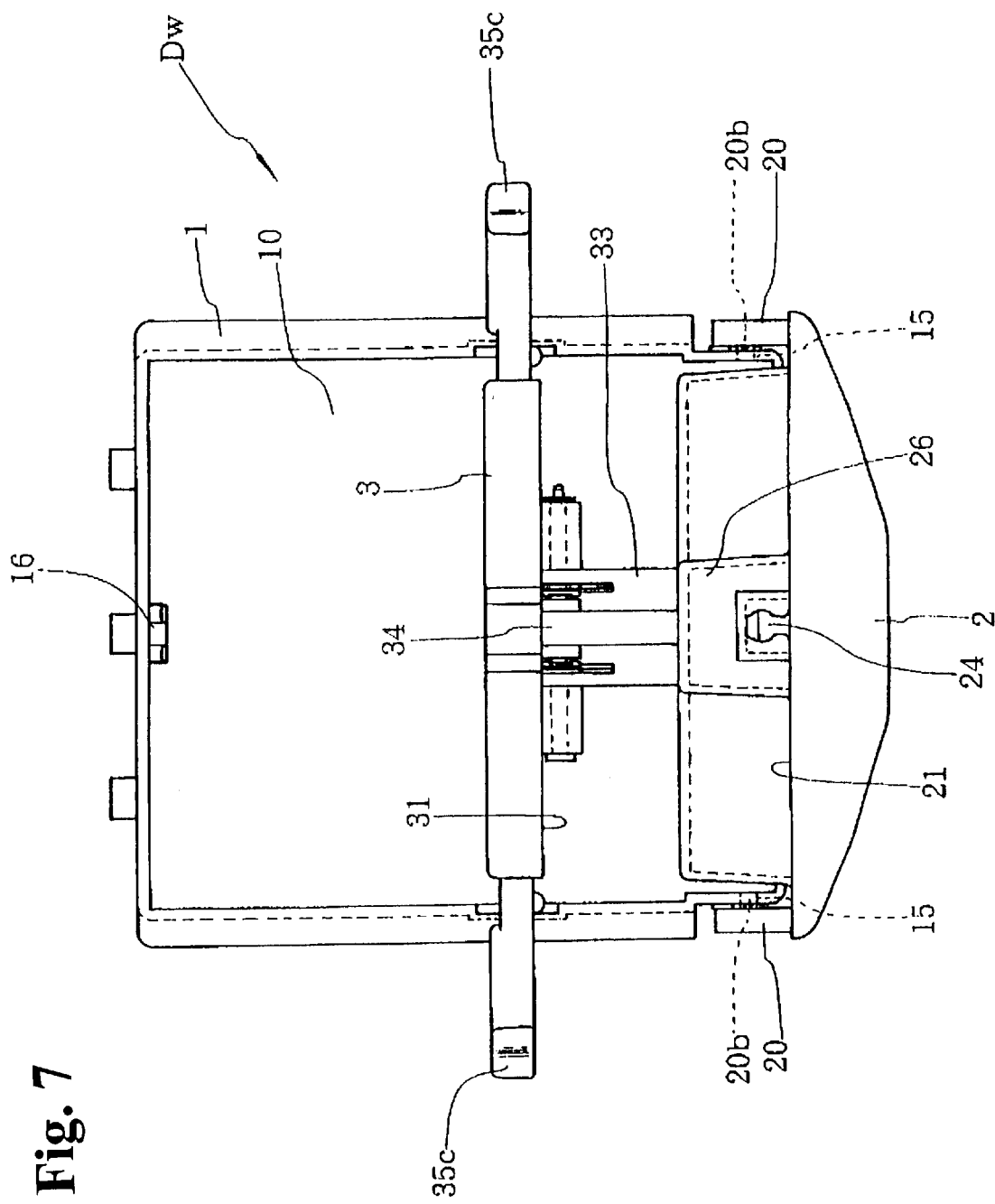
FIG. 7 is a side view from a direction different from FIG. 5 of the article holder.
Figure 8:
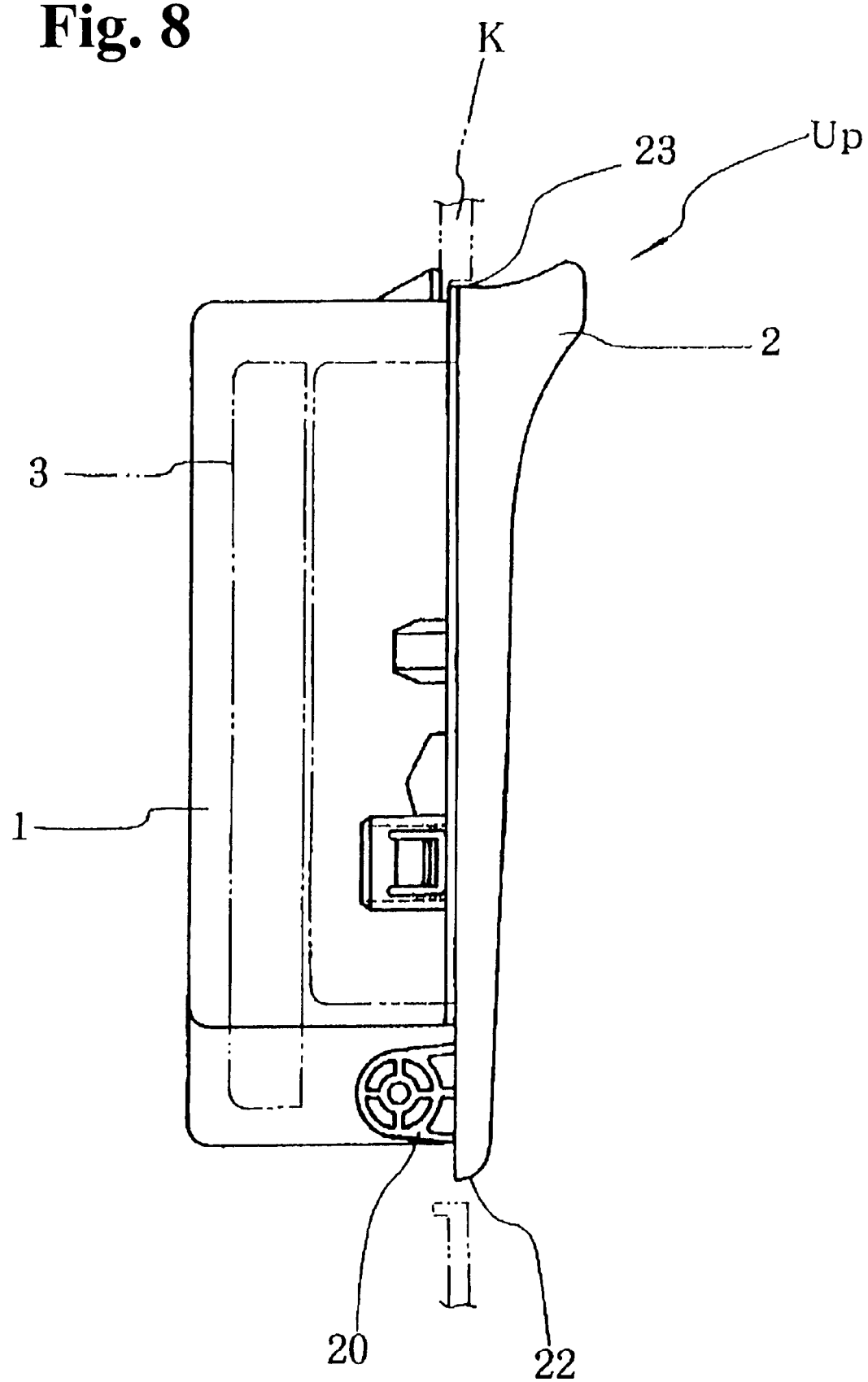
FIG. 8 is a side view of the article holder with the lid in the stand-up position.

Also, FIGS. 5 to 9 show an example where the article holder shown in FIGS. 1 to 4 is applied specifically, wherein FIG. 5 shows a state where an essential part of the article holder, the lid 2 of which is opened in the flat-down position Dw, is viewed in section from the side; FIG. 6 shows a state where the same is viewed from an upper side; and FIG. 7 shows a state where the same is viewed from a right side. Also, FIG. 8 shows a state where the applied article holder with the lid 2 closed in the stand-up position Up is viewed from the side; and FIG. 9 shows a state where the essential part of the applied article holder is viewed in section from the side.

The article holder of an embodiment according to the present invention includes: a case 1 to be incorporated or assembled into a subject K (hereinafter referred to as "assembling subject") such that an opening 10 thereof is vertically positioned; a lid 2 rotatably assembled to the case 1 to be rotatable from its stand-up position Up for closing the opening 10 of the case 1 to its flat-down position Dw for opening the opening 10; an article holding member 3 disposed on an inner side of the lid 2; and a linking mechanism 4 for allowing the article holding member 3 to separate from an inner surface of the lid 2 and to move in front of the opening 10 of the case 1 as the lid 2 is rotated to its flat-down position Dw.

When the lid 2 is rotated to the flat-down position Dw, the article holding member 3 housed in the case 1 in the stand-up position Up is located over the lid 2 in the flat-down position Dw, so that various articles can be held by the article holding member 3 on a side of the assembling subject K to which the case is incorporated.

The present embodiment has a structure such that the case 1 with the opening 10 to be vertically disposed relative to the assembling subject K is incorporated into the assembling subject K through an incorporating or assembling hole Ka thereof.

Specifically, the case 1 includes an inner plate 11 with a vertically disposed plate surface, two side plates 12, and top and bottom plates 13, 14 with horizontally disposed plate surfaces. A side facing the inner plate 11 is defined as the opening 10. The case 1 is incorporated into the incorporating hole Ka so that an imaginary surface, i.e. the opening surface, including opening edges of the opening 10 is aligned with a vertical wall surface Kb of the assembling subject K.

The lid 2, in the embodiment, has a size to close the opening 10 of the case 1. Also, the lid 2 is assembled to the case 1 to be rotated by about 90° from the stand-up position Up for closing the opening 10 of the case 1 to the flat-down position Dw for opening the opening 10.

Specifically, the lid 2 has projections 20 provided with shaft holes 20a on both sides of a lower side portion 22 in an inner surface portion 21 thereof when the lid 2 is in the stand-up position Up. Then, a shaft 20b is inserted into the shaft holes 15 formed on both side plates 12 on a side of the bottom plate 14 of the case 1 and the shaft holes 20a provided in the projections 20 of the lid 2 to assemble the lid 2 to the case 1. Thus, the lid 2 is rotated around the shaft 20b from the stand-up position Up where an upper side portion 23 thereof contacts an edge of the top plate 13 of the case 1 to the flat-down position Dw.

Also, in the present embodiment, a striker 24 disposed at substantially the center of the upper side portion 23 of the lid 2 engages a latch 16 located at an inner portion of the top plate 13 of the case 1 at the stand-up position Up, so that the lid 2 is held in a stand-up state at the stand-up position Up.

Incidentally, in the present embodiment, the lid 2 is formed in such a size that, in the stand-up position Up, a forward edge of the lower side portion 22 of the lid 2 slightly projects downward from an outer surface of the bottom plate 14 of the case 1. Thus, there is formed a space 17 for allowing the lower side portion 22 of the lid 2 to escape into the assembling subject K between an outer surface of the bottom plate 14 of the case 1 and a lower hole edge of the assembling hole Ka when the lid 2 is rotated from the stand-up position Up to the flat-down position Dw. Also, there is formed a protruding holding portion 25 on an outer side of an upper portion 23 of the lid 2 for facilitating a rotating operation of the lid 2 from the stand-up position Up to the flat-down position Dw.

On the other hand, in the present embodiment, a raised portion 26 is formed on an inner surface portion 21 of the lid 2, and at the same time, a groove-like portion 27 is provided at a position for dividing the raised portion 26 substantially into two parts in the left and right directions of the lid 2. The groove-like portion 27 is formed on a side of the lower side portion 22 of the lid 2 and to extend straight from the side of the lower side portion 22 to a side of the upper side portion 23.

In the embodiment, between a pair of groove walls 27a for constituting the groove-like portion 27, there is rotatably assembled a lift arm 33, described later, for holding the article holding member 3 to the lid 2 such that as the lid 2 is rotated toward the flat-down position Dw, the article holding member 3 is separated from the inner surface of the lid 2 and moved to be pushed out in front of the opening 10 of the case 1; and there is also assembled a slider 40 for constituting a linking mechanism 4, described later, for allowing the lift arm 33 to operate as described above.

In the present embodiment, the article holding member 3 is disposed on the inner surface side of the lid 2, and is housed in the case 1, the opening 10 of which is closed by the lid 2 in its stand-up position Up. Also, the article holding member 3 includes a plate-like main portion 30 having wide surfaces on both sides, and is supported parallel to the lid 2 above the inner surface portion 21 thereof while the lid 2 is rotated from the stand-up position Up to the flat-down position Dw.

In the embodiment, the article holding member 3 is supported by and assembled to the lid 2, as described above, through the lift arm 33 and a sub arm 34 located between the lid 2 and the article holding member 3.

The lift arm 33 is rotatably assembled in the groove-like portion 27 between both edges at a substantially middle position of the groove-like portion 27 in its extending direction formed on the inner surface portion 21 of the lid 2. Also, one edge portion (hereinunder referred to as "an upper edge portion 33a of the lift arm 33", and the other edge portion of the lift arm 33 opposite to the upper edge portion 33a is referred to as "a lower edge portion 33d") of the lift arm 33 is rotatably assembled to a back surface portion 31 of the article holding member 3, i.e. a side of the article holding member 3 facing the lid 2. Specifically, the lift arm 33 is formed in a long plate-like shape, and is rotatably assembled between a pair of groove walls 27a for constituting the groove-like portion 27 by inserting shaft protrusions 33g projecting from both side edges of the lift arm 33 between the upper and lower edge portions 33a, 33d into shaft holes 27b provided to the groove walls 27a of the groove-like portion 27. Also, the lift arm 33 includes a concave 33b, at the upper edge portion 33a thereof, for receiving therein a protrusion 31a with a shaft hole 31b protruded from the back surface portion 31 of the article holding member 3, and the upper edge portion 33a is rotatably assembled to the article holding member 3 by inserting a shaft projection 33c disposed in the concave 33b into the shaft hole 31b of the protrusion 31a of the article holding member 3.

Also, the sub-arm 34 is formed in a bar shape, and one edge portion thereof is rotatably assembled between the pair of groove walls 27a for constituting the groove-like portion 27 at a position closer to a side of an upper side portion 23 of the lid 2 than the position where the lift arm 33 is rotatably assembled. At the same time, the other edge portion of the sub-arm 34 is rotatably assembled to the back surface portion 31 of the article holding member 3 at a position closer to an edge portion (hereunder, referred to as "forward edge portion 32 of the article holding member 3") located right over the upper side portion 23 of the lid 2 in the article holding member 3 than the rotatably assembled position of the lift arm 33 and the article holding member 3.

Rotating shafts of the lift arm 33 and the sub-arm 34 for the lid 2 and rotating shafts of the lift arm 33 and the sub-arm 34 for the article holding member 3 are disposed parallel to a rotating shaft of the lid 2 for the case 1.

Also, a stroke or length from a rotatably assembled position of the lift arm 33 and the lid 2 to a rotatably assembled position of the lift arm 33 and the article holding member 3 is structured to be substantially equal to a stroke or length from a rotatably assembled position of the sub-arm 34 and the lid 2 to a rotatably assembled position of the sub-arm 34 and the article holding member 3.

Also, at a position where the article holding member 3 approaches closest to the lid 2, i.e. a position shown in FIG. 4, the rotatably assembled positions of the lift arm 33 and the sub-arm 34 are positioned closer to the article holding member 3 than those to the lid 2.

Thus, in the present embodiment, first, the article holding member 3 is held or disposed to be separable from or accessible to the inner surface side of the lid 2 so that the article holding member 3 and the lid 2 are always held substantially parallel to each other. Second, according to the movement of the article holding member 3 in a direction separating from the lid 2, the article holding member 3 as a whole is regularly moved in a direction apart from the rotatably assembled position of the lid 2 and the case 1, i.e. in a direction moving in front of the opening 10 of the case 1 as the lid 2 rotates toward the flat-down position Dw.

As a result, according to the rotation of the lid 2 from the stand-up position Up to the flat-down position Dw, when the lower edge portion 33d of the lift arm 33 is pulled in a direction approaching the rotatably assembled position of the lid 2 and the case 1, the article holding member 3 positioned closest to the lid 2 at the stand-up position Up is gradually separated from the lid 2 as the article holding member 3 approaches the flat-down position Dw, and moved in front of the opening 10 of the case 1.

Also, as the lid 2 is rotated from the flat-down position Dw to the stand-up position Up, when the lower edge portion 33d of the lift arm 33 is pushed in a direction apart from the rotatably assembled position of the lid 2 and the case 1, the article holding member 3 separated from the lid 2 at the flat-down position Dw gradually approaches the lid 2, toward the side of the opening 10 of the case 1 as the lid 2 is approaching the stand-up position Up, and further, the forward edge of the article holding member 3 moved in front of the opening 10 at the flat-down position Dw can be moved downward from the inner side of the top plate 13 of the case 1 so as not to prevent the article holding member 3 from being housed in the case 1.

In the present embodiment, the linking mechanism 4 is formed of a slider 40 provided in the groove-like portion 27 of the lid 2 to slidably move therealong; and a linking arm 41 rotatably assembled to the case 1 and connected to the slider 40 to move the same according to the rotation of the lid 2 from the stand-up position Up to the flat-down position Dw or from the flat-down position Dw to the stand-up position Up.

A forward edge 40a of the slider 40 facing the forward edge side of the lid 2, i.e. a side of the upper side portion 23, is rotatably assembled to the lower edge portion 33d opposite to the upper edge portion 33a of the lift arm 33 assembled to the article holding member 3, and the slider 40 is provided to the lid 2 to be movable to the rotatably assembled side with the case 1 from the side of the upper side portion 23 of the lid 2, or to the upper side portion 23 of the lid 2 from the rotatably assembled side with the lid 2. Specifically, libs 40b provided on both sides of the slider 40 along its moving direction are inserted under libs 27c formed on the pair of the groove walls 27a constituting the groove-like portion 27 in a state where one end portion of the slider 40 projects through the opening of the groove-like portion 27 on the side of the lower side portion 22 of the lid 2 to be movable in the groove-like portion 27. Also, the forward edge 40a of the slider 40 is provided with shaft projections 40c on both sides, while the lower edge portion 33d of the lift arm 33 is provided with a concave 33e to receive therein the forward edge 40a of the slider 40. Also, both side portions for constituting the concave 33e are provided with shaft holes 33f to receive therein the shaft projections 40c. In the present embodiment, the shaft projections 40c provided to the forward edge 40a of the slider 40 are received in the shaft holes 33f provided at the lower edge portion 33d of the lift arm 33, so that the lower edge portion 33d of the lift arm 33 is rotatably assembled to the slider 40.

On the other hand, the linking arm 41 is structured such that one end thereof is rotatably assembled to the case 1 and the other end is rotatably assembled to a rear end 40d of the slider 40, so that the slider 40 is moved in a direction apart from the forward end side of the lid 2, i.e. the side of the upper side portion 23 of the lid 2, as the lid 2 is rotated to the flat-down position Dw, while the slider 40 is moved in a direction approaching the forward end side of the lid 2 when the lid 2 is rotated to the stand-up position Up from the flat-down position Dw. Specifically, the linking arm 41 is rotatably assembled to the case 1 in a state where shaft projections 41a provided to one end side of the linking arm 41 are housed in the shaft holes 18a between a pair of projecting members 18 having the shaft holes 18a formed on an inner surface of the bottom plate 14 of the case 1. Also, the linking arm 41 on the other end thereof includes a concave 41b for receiving therein the rear edge 40d of the slider 40, and is rotatably assembled to the slider 40 by inserting the respective shaft projections 40e provided on both sides of the rear edge 40d of the slider 40 into the shaft holes 41c provided on both side portions for constituting the concave 41b. The rotatably assembled position of the linking arm 41 and the case 1 is disposed above the rotatably assembled position of the case 1 and the lid 2.

A rotation shaft at a rotatably assembled portion of the linking arm 41 and the case 1, a rotation shaft at a rotatably assembled portion of the linking arm 41 and the slider 40, and a rotation shaft at a rotatably assembled portion of the slider 40 and the lift arm 33 are disposed substantially parallel to the rotation shaft of the lid 2 with respect to the case 1, respectively.

Thus, in the present embodiment, when the lid 2 is rotated from the stand-up position Up to the flat-down position Dw, the slider 40 can be slidably moved in the direction approaching the rotatably assembled position with the lid 2 by the linking arm 41 for transferring the rotatably assembled position with the slider 40 downward around the rotatably assembled position of the case 1. Through the movement of the slider 40, the lower edge portion 33d of the lift arm 33 is pulled to rotate the lift arm 33 so that the article holding member 3 is moved in a direction apart from the lid 2 (FIG. 4 to FIG. 3, and FIG. 3 to FIG. 2).

Also, when the lid 2 is rotated from the flat-down position Dw to the stand-up position Up, the slider 40 can be slidably moved in the direction apart from the rotatably assembled position with the lid 2 by the linking arm 41 for transferring the rotatably assembled position with the slider 40 upward around the rotatably assembled position of the case 1. Through the movement of the slider 40, the lower edge portion 33d of the lift arm 33 is pushed to rotate the lift arm 33 so that the article holding member 3 is moved in a direction approaching the lid 2 (FIG. 2 to FIG. 3, and FIG. 3 to FIG. 4).

Incidentally, in the present embodiment, with respect to a linear movement of the slider 40 through rotation of the linking arm 41, since the lift arm 33, the lower edge portion 33d of which is rotatably assembled to the slider 40, is rotated around the rotatably assembled position with the lid 2, shaft holes 33f for receiving therein the shaft projections 40c of the slider 40 provided to the lower edge portion 33d of the lift arm 33 are formed in a shape of a slit along the longitudinal direction of the lift arm 33, so that the linear movement of the slider 40 is smoothly converted to a rotating movement for the lift arm 33.

Since the article holder according to the present invention has the structure as described above, as the lid 2 is rotated from the stand-up position Up to the flat-down position Dw, the article holding member 3 can be separated from the lid 2 and moved in front of the opening 10 of the case 1 in a pushed-out state by the lift arm 33 rotated through the linking mechanism 4.

As a result, first, the article holding member 3 is positioned over the lid 2 and supported thereon in a state where the article holding member 3 is separated from the assembling subject K. Thus, an article can be held in a state where a space between the assembling subject K and the article held on the article holding member 3 or the article positioned on the lid 2 while being supported by the article holding member 3 at its side portion is widened.

Second, the article can be held in a state where the space between the lid 2 and the article holding member 3 is widened.

Third, in the stand-up state of the lid 2, a space between the lid 2 and the case 1 is shortened, so that the article holding member 3 can be housed in the case 1 with a minimum housing space, i.e. main depth of the case 1.

Fourth, since the article holding member 3 can be held over the lid 2 by the lift arm 33 at the back surface 31 of the article holding member 3, there is no part for preventing a support of the article in holding the space over the article holding member 3.

In case the article holding member 3 is formed in a shape of a tray, when the lid 2 is rotated to the flat-down position Dw, various articles can be held on the article holding member 3 in the side of the assembling subject K.

Also, in case the article holding member 3 includes holding portions 35, such as holes provided in a thickness direction of the article holding member 3, for holding side portions of a plurality of beverage containers J, such as a juice can, PET bottle and cup, in the stand-up state, when the lid 2 is rotated to the flat-down position Dw, each beverage container J can be held in the stand-up state with a bottom Ja placed on the inner surface portion 21 of the lid 2 with help of the holding portion 35 of the article holding member 3 at a side portion of the assembling subject K. In this case, since the space between the lid 2 and the article holding member 3 is widened by an action of the lift arm 33 and the linking member 4, the beverage container J can be easily held at a position close to an upper portion of the opening 10, so that a tall beverage container J can also be stably held.

In the present embodiment, there are provided holding holes 35a disposed on both sides of the article holding member 3 to hold the beverage containers J in the thickness direction of the article holding member 3, and bottom placing surfaces 28 for stably placing thereon the bottoms Ja of the respective beverage containers J on the inner surface portion 21 of the lid 2 right under the holding holes 35a, so that the two beverage containers J can be held by the holding holes 35a and the bottom placing surfaces 28 when the lid 2 is in the flat-down position Dw. Although each holding hole 35a is structured to be a semicircular concave 35b opened outward at each side portion in a longitudinal direction of the article holding member 3, a substantially circular holding space is formed by each holding hole 35a and a curved member 35c, one end of which is rotatably assembled to one of both corners of an entrance of each opening with a curved inner side facing an inner side of the holding hole 35a.

Also, in case the assembling subject K is a center console in an automobile and the opening 10 of the case 1 is vertically disposed against a wall surface in the center console on a side of rear seats of the automobile, even when a console lid is opened to approach the article held on the article holding member 3, the console lid does not hinder the article held on the article holding member as much as possible by positioning the article holding member 3 with a widened space between the opening 10 of the case 1, i.e. the assembling subject K, and the article holding member through the operations of the lift arm 33 and the linking mechanism 4 in the flat-down position Dw of the lid 2.

Incidentally, in the present embodiment, the lift arm 33 is formed such that the rotatably assembled side of the lid 2 with respect to the case 1 becomes a curved inner side of the lift arm 33, and is assembled to the lid 2, i.e. the groove walls 27a of the groove-like portion 27 formed on the lid 2, at the curved position 33h.

Also, a stroke or length between the curved position 33h and a rotatably assembled position of the lift arm 33 and the article holding member 3, i.e. the upper edge portion 33a of the lift arm 33, is structured to be longer than that between the curved position 33h and a rotatably assembled position of the lift arm 33 and the slider 40, i.e. the lower edge portion 33d of the lift arm 33.

As a result, in the present embodiment, even if a moving quantity or length of the slider 40 is small, the upper edge portion 33a of the lift arm 33 can be greatly moved, so that while limiting the moving quantity of the slider 40 by the linking arm 41 to the minimum, the article holding member 3 can be effectively moved in a direction away from the lid 2 and in front of the opening 10 of the case 1.

Next, a more specific application example of the article holder as described above is explained with reference to FIGS. 5 to 9.

FIGS. 5 to 9 show an application example where the article holder is used as a cup holder. More specifically, in the application example, the holding holes 35a for holding beverage containers J provided in a thickness direction of the article holding member 3 on both sides thereof are formed, and bottom placing surfaces 28 on which bottoms Ja of the beverage containers J are stably placed are formed right under the holding holes 35a on the inner surface portion 21 of the lid 2, so that the two beverage containers J can be held by the holding holes 35a and the bottom plating surfaces 28 at the flat-down position Dw of the lid 2.

While the holding holes 35a are formed as semicircular concaves 33b opened outward on both side portions in a longitudinal direction of the article holding member 3, one end of the curved member 35c is rotatably assembled to one of the entrance corners of the concave so that an inner side of each holding hole 35a becomes a curved inner side. Thus, a substantially circular holding space is formed by one holding hole 35a and one curved member 35c (refer to FIG. 6).

More specifically, in the present application example, the curved member 35c includes: (1) a curved portion 35d; (2) a bar-like base portion 35e, one end of which is integrally connected to one end of the curved portion 35d and the other end of which is rotatably assembled on a rotatably assembled side of the lid 2 to the article holding member 3 by a rotating shaft 35f provided in a thickness direction of the article holding member 3; and (3) a projecting portion 35g integrally formed to project outward from a side portion in a longitudinal direction of the article holding member 3 from the other end of the bar-like base portion 35e.

In the present application example, in the stand-up position Up of the lid 2, the curved member 35c is positioned to house the curved portion 35d in the holding hole 35a, and as the lid 2 is rotated to the flat-down position Dw, the curved member 35c is rotated around the rotating shaft to project the curved portion 35d to the side of the article holding member 3 from the holding hole 35a by an urging force of a helical torsion spring 35h wherein a rotating shaft 35f of the bar-like base portion 35e is housed in a winding portion. Then, in the flat-down position Dw of the lid 2, the holding space is formed between the holding hole 35a and the curved member 35c. Also, as the lid 2 in the flat-down position Dw is rotated to the stand-up position Up, the projecting portion 35g abuts against an edge portion of the opening 10 of the case 1. As the lid 2 is rotated to the stand-up position Up, the curved portion 35d is rotated around the rotating shaft 35f to be housed again in the holding hole 35a against the urging force of the helical torsion spring 35h.

Also, in the present application example, there is provided a helical torsion spring 35i for receiving at an inner side of the winding portion thereof the rotatably assembling shaft, i.e. shaft projection 33c, for the upper portion 33a of the lift arm 33 and the back surface portion 31 of the article holding member 3. One end of the helical torsion spring 35i is pressed against the side of the lift arm 33 and the other end thereof is pressed against the side of the back surface portion 31 to thereby urge the article holding member 3 to be lifted upward in the flat-down position Dw of the lid 2, so that the article holding member 3 is supported by the lift arm 33 without wobbling in the flat-down position Dw of lid 2.

Also, in the present application example, an arc shape depressed portion 29 similar to a moving path of the forward edge of the lower edge portion 33d of the lift arm 33 is formed on the inner surface portion 21 of the lid 2, and the lift arm 33 is smoothly rotated according to the rotation of the lid 2.

Incidentally, in the respective drawings showing the present application example, the same symbols as those used in FIGS. 1 to 4 are assigned to the portions having substantially the same structures as those of the article holder as shown in FIGS. 1 to 4, and explanations thereof are omitted.

According to the article holder of the present invention, in a situation that the case is assembled in the assembling subject and the opening of the case is closed by the lid, as the lid is rotated to its flat-down position, the article holding member disposed in the inner side portion of the lid can be separated therefrom, and moved in a direction away from the assembling subject. Thus, an article can be easily and properly held by the article holding member at a position away from a necessary length from the assembling subject.

While the invention has been explained with reference to the specific embodiments of the invention, the explanation is illustrative and the invention is limited only by the appended claims.

What is claimed is:

1. An article holder comprising:
   a case to be assembled in an assembling subject and having an opening positioned substantially in a vertical direction,
   a lid rotatably attached to the case to be rotatable between a stand-up position for closing the opening of the case and a flat-down position for opening the opening, and having an inner surface portion, a connecting portion with the case and a forward edge opposite to the connecting portion,
   an article holding member movably disposed above the inner surface of the lid,
   a lift arm rotatably attached to the article holding member and the inner surface portion of the lid to move and lift the article holding member, and
   a linking mechanism attached to the lift arm to move the article holding member away from the inner surface portion of the lid and to move the article holding member in front of the opening of the case as the lid is rotated to the flat-down position.

2. An article holder as claimed in claim 1, wherein said linking mechanism includes a slider having a front portion rotatably attached to one end portion of the lift arm to be able to slide from a side of the forward edge of the lid to a side of the connecting portion, and a rear end portion; and a linking arm having one end portion rotatably connected to the case and the other end portion rotatably connected to the rear end portion of the slider so that as the lid is rotated to the flat-down position, the slider is moved in a direction away from the forward edge of the lid.

3. An article holder as claimed in claim 2, wherein said lift arm includes a front end portion rotatably attached to the article holding member, and a bent portion near the end portion thereof and rotatably attached to the lid, an inner side of the bent portion facing the connecting portion, a length between the bent portion and the front end portion thereof being longer than that between the bent portion and the end portion thereof.

4. An article holder as claimed in claim 3, wherein the one end portion of the linking arm connected to the case is located above the connecting portion with the lid to move the slider in association with a movement of the lid.

5. An article holder as claimed in claim 1, wherein said article holding member includes a holding portion for holding a container in a stand-up state at a side thereof.

6. An article holder as claimed in claim 1, further comprising a sub-arm rotatably connected to the lid and the article holding member to stably hold the article holding member.

7. An article holder as claimed in claim 6, where said lid includes a raised portion at an inner side thereof, and a groove in the raised portion, said linking mechanism being slidably situated in the groove.

* * * * *